United States Patent
Seki et al.

(10) Patent No.: US 8,899,968 B2
(45) Date of Patent: Dec. 2, 2014

(54) COMBUSTIBLE GAS PROCESSING SYSTEM AND COMBUSTIBLE GAS PROCESSING METHOD

(75) Inventors: Kenji Seki, Higashiosaka (JP); Masataka Masuda, Amagasaki (JP); Hirofumi Ohtsuka, Ikoma (JP); Etsuo Shito, Matsubara (JP); Katsuhiko Hirao, Nara (JP)

(73) Assignee: Osaka Gas Co., Ltd., Osaka (JP)

( * ) Notice: Subject to any disclaimer, the term of this patent is extended or adjusted under 35 U.S.C. 154(b) by 748 days.

(21) Appl. No.: 12/670,058

(22) PCT Filed: Jul. 22, 2008

(86) PCT No.: PCT/JP2008/063099
§ 371 (c)(1),
(2), (4) Date: Feb. 25, 2010

(87) PCT Pub. No.: WO2009/014109
PCT Pub. Date: Jan. 29, 2009

(65) Prior Publication Data
US 2010/0196833 A1 Aug. 5, 2010

(30) Foreign Application Priority Data

Jul. 25, 2007 (JP) ................. 2007-193601

(51) Int. Cl.
*F23L 7/00* (2006.01)
*F23Q 11/00* (2006.01)
*B01D 53/86* (2006.01)
*C01B 3/24* (2006.01)
*C10L 3/06* (2006.01)
*C01B 3/38* (2006.01)

(52) U.S. Cl.
CPC ........... *C10L 3/06* (2013.01); *C01B 2203/1241* (2013.01); *C01B 2203/0233* (2013.01); *C01B 3/384* (2013.01); *C01B 2203/1082* (2013.01); *C01B 2203/127* (2013.01); *C01B 2203/0822* (2013.01); *C01B 2203/0811* (2013.01); *C01B 2203/1058* (2013.01); *C01B 2203/1047* (2013.01); *C01B 2203/0827* (2013.01)
USPC .............. 431/2; 431/268; 423/210; 48/127.1; 48/198.1; 60/752

(58) Field of Classification Search
USPC ............ 431/2, 268; 423/210; 48/127.1, 198.1
See application file for complete search history.

(56) References Cited

U.S. PATENT DOCUMENTS

| | | | | |
|---|---|---|---|---|
| 4,472,935 A * | 9/1984 | Acheson et al. | ................ | 60/777 |
| 5,229,089 A * | 7/1993 | Ramachandran et al. | .... | 423/210 |
| 6,331,283 B1 * | 12/2001 | Roy et al. | ........................ | 423/652 |
| 6,360,793 B1 * | 3/2002 | Sugano et al. | ................ | 141/197 |
| 2003/0021742 A1 * | 1/2003 | Krause et al. | ................ | 422/187 |

FOREIGN PATENT DOCUMENTS

| | | |
|---|---|---|
| CN | 1214037 A | 4/1999 |
| CN | 1495247 A | 5/2004 |
| CN | 1966627 A | 5/2007 |
| JP | 58174239 A | 10/1983 |

(Continued)

*Primary Examiner* — Kenneth Rinehart
*Assistant Examiner* — William Corboy
(74) *Attorney, Agent, or Firm* — The Webb Law Firm

(57) ABSTRACT

Disclosed is a system for processing a combustible gas, which comprises a catalytic combusting means for receiving an oxygen-containing combustible gas that contains oxygen in addition to the combustible gas as the principal component thereof, causing this oxygen-containing combustible gas to contact an oxidation catalyst for partial combustion thereof, to produce the resultant partially combusted gas as a compressible combustible gas.

5 Claims, 3 Drawing Sheets

(56) References Cited

FOREIGN PATENT DOCUMENTS

| | | | |
|---|---|---|---|
| JP | 58176104 A | 10/1983 |
| JP | 58198591 A | 11/1983 |
| JP | 63004852 A | 1/1988 |
| JP | 07053976 A | 2/1995 |
| JP | 08337402 A | 12/1996 |
| JP | 09264196 A | 10/1997 |
| JP | 10203802 A | 8/1998 |
| JP | 2005207561 A | 8/2005 |
| WO | 2006065602 A2 | 6/2006 |

* cited by examiner

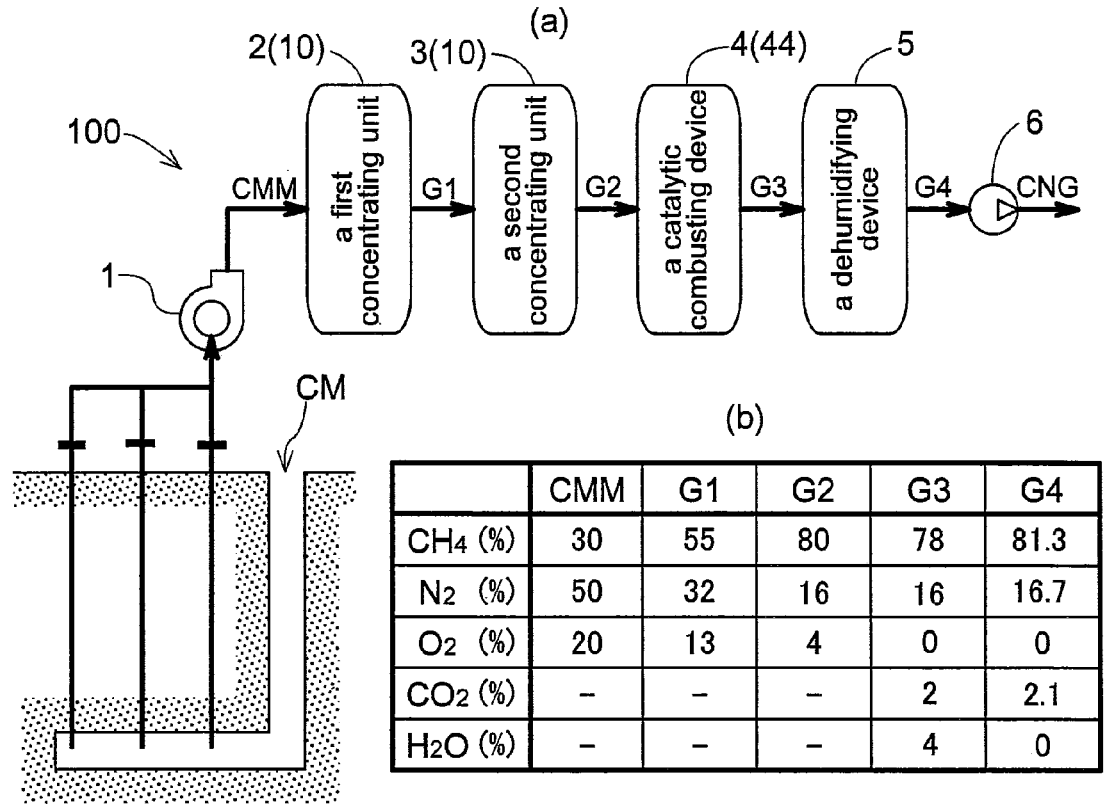
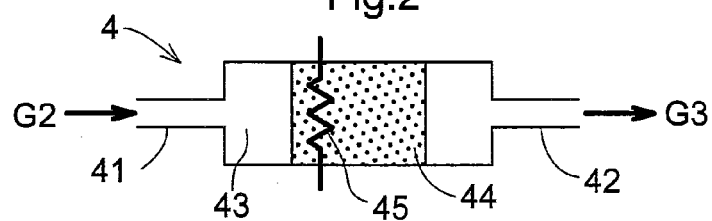
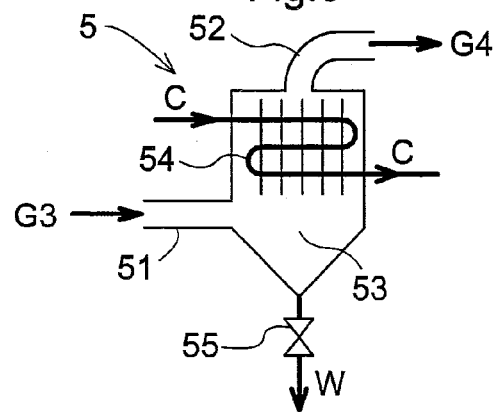

Fig.4
(a)
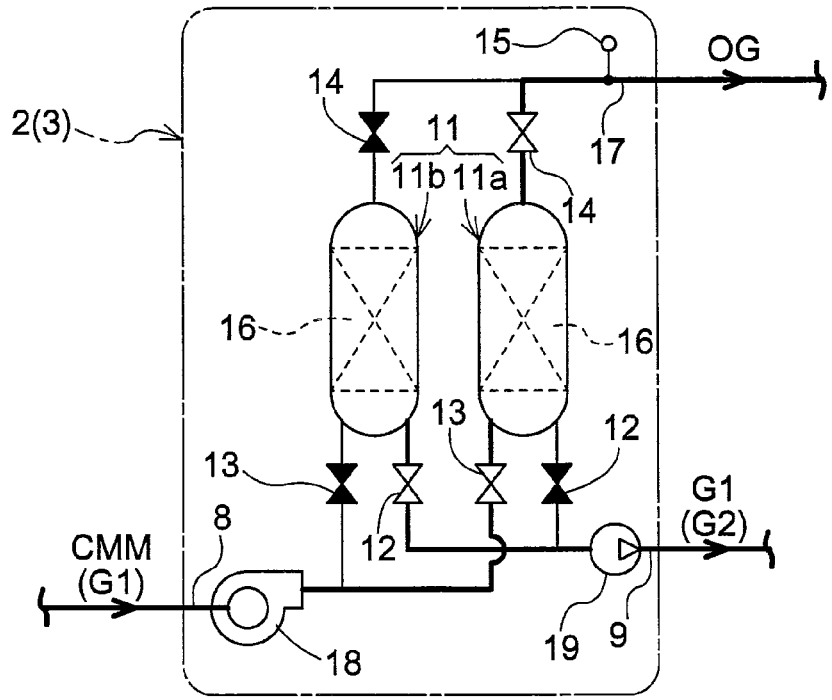
(b)
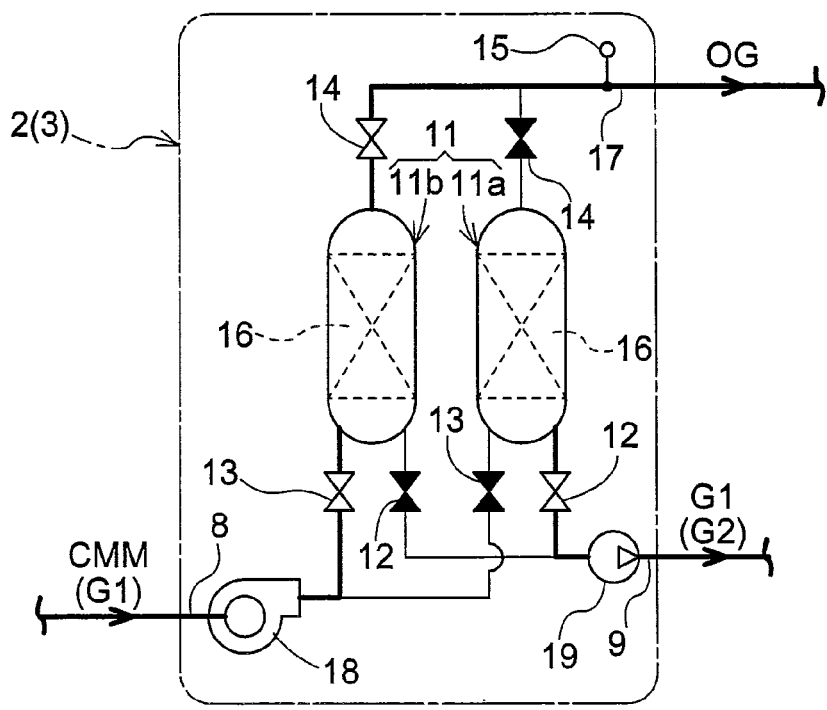

COMBUSTIBLE GAS PROCESSING SYSTEM AND COMBUSTIBLE GAS PROCESSING METHOD

TECHNICAL FIELD

The present invention relates to a combustible gas processing system and a combustible gas processing method for producing a compressible (to be compressed) combustible gas containing a predetermined combustible gas as a principal component thereof to be compressed by a compressor into a compressed combustible gas.

BACKGROUND ART

As a compressed combustible gas produced by compressing a predetermined combustible gas, there are known e.g. a compressed natural gas (CNG) produced by compressing a natural gas containing methane as its principal component and a compressed hydrogen gas produced by compressing hydrogen.

In recent years, automobiles mounting an engine using such compressed combustible gas as fuel have been gaining popularity to cope with the environmental issue, since they produce much less amounts of carbon dioxide, nitrogen oxides, sulfur oxides, particulate matters, etc., as compared with automobiles mounting engines using gasoline or the like as fuel.

An automobile running on the compressed combustible gas as fuel needs to receive supply of the compressed combustible gas by running to a gas filling station, just like the automobile running on the gasoline fuel. And, at this gas filling station, a compressible combustible gas containing combustible gas as its principal component is compressed by a compressor to a very high pressure (e.g. about 20.3 MPa (200 atm)) to be processed into compressed combustible gas and this compressed combustible gas is charged to a high-pressure tank mounted on the automobile (see. Patent Document 1).

For instance, coal mine gas mined in a coal mine contains air components (mainly, nitrogen, oxygen, carbon dioxide) in addition to methane as the combustible gas. In this way, naturally occurring combustible gases are often mined as (raw) material gases containing air components in addition to the combustible gas. In order to effectively utilize such material gases as fuels, it is needed to remove such air components contained in the material gas and to concentrate the combustible gas contained therein.

Especially, if this material gas is to be processed into a compressible combustible gas which is compressed by a compressor into the compressed combustible gas usable as the automobile fuel, for instance, in order to prevent occurrence of e.g. ignition due to the compression, it is needed to remove oxygen contained in that material gas to an extremely low concentration (e.g. lower than 4%).

That is, safety regulation is enforced which provides oxygen concentration upper limits for ensuring safety in the compression in the production process of compressed combustible gas to 4% for such combustible gases as methane, excluding acetylene, ethylene and hydrogen, and to 2% for acetylene, ethylene and hydrogen.

As a concentrating device for concentrating methane by removing the air components from the coal mine gas, there is known an adsorption type concentrating device utilizing an adsorbent formed of natural zeolite that preferentially adsorbs the air components than methane (see. e.g. Patent Document 2).

Further, the adsorption type concentrating apparatus disclosed in Patent Document 2 includes an adsorption tower charged therein with the adsorbent preferentially adsorbing the air components other than the combustible gas and the device is configured to effect in alternate repetition, an adsorbing operation for pressure-feeding material gas such as coal mine gas at a relatively high pressure into the adsorption tower and causing an adsorbent material to adsorb preferentially the air component contained in the coal mine gas and a desorbing operation for discharging concentrated gas containing a large amount of combustible gas which was not adsorbed by the adsorbent or which has been preferentially desorbed from the adsorbent, by depressurizing the inside of the adsorption tower to the atmospheric pressure.

Patent Document 1: Japanese Patent Application "Kokai" No. 9-264196

Patent Document 2: Japanese Patent Application "Kokai" No. 58-198591

DISCLOSURE OF THE INVENTION

However, in the case of concentrating the combustible gas through removal of the air components from the material gas with utilization of adsorbent, as is done with the adsorption type concentrating device disclosed in Patent Document 2 above, although the concentrated gas obtained sometimes contains the combustible gas as its principal component (e.g. 70%), the gas still retains therein oxygen which was not removed by the adsorbent by an amount greater than or equal to the upper limit of oxygen concentration (e.g. 4%) for allowing safe compression in the production process of the compressed combustible gas.

And, the prior art has failed to provide any effective method for removing, from the oxygen-containing combustible gas containing combustible gas as its principal component with oxygen content higher than the upper limit, the oxygen to an extremely low concentration (e.g. less than 4%). Thus, it has not been possible to utilize material gas such as coal mine gas that contains air components in addition to methane, as a compressed combustible gas for use as e.g. automobile fuel.

The present invention has been made in view of the above-described state of the art and its principal object is to provide, for use in a combustible gas processing for producing a compressible combustible gas containing a predetermined combustible gas such as methane, hydrogen or the like as a principal component thereof to be compressed by a compressor into a compressed combustible gas, a technique that allows removal of oxygen to an extremely low concentration from an oxygen-containing combustible gas containing combustible gas as its principal component and containing also oxygen by an amount greater than or equal to an upper limit oxygen concentration that ensures safety in the compression in the production process of the compressed combustible gas, the technique further allowing effective utilization of a material gas such as coal mine gas containing air components in addition to methane, as a compressed combustible gas as automobile fuel.

For accomplishing the above-noted object, according to a characterizing feature of the present invention, there is provided a combustible gas processing system for producing a compressible combustible gas containing a predetermined combustible gas as a principal component thereof to be compressed by a compressor into a compressed combustible gas, characterized in that the system comprises a catalytic combusting means for receiving an oxygen-containing combustible gas that contains oxygen in addition to the combustible gas as the principal component thereof, causing this oxygen-containing combustible gas to contact an oxidation catalyst for partial combustion thereof, to produce the resultant partially combusted gas as said compressible combustible gas.

According to the above-described characterizing feature, by the catalytic combusting means, the oxygen-containing combustible gas is caused to contact the oxidation catalyst, whereby there occurs a so-called partial combustion in which a trace amount of the combustible gas richly contained in the oxygen-containing combustible gas is combusted with utilization of a small amount of oxygen contained in this oxygen-containing combustible gas. In the resultant compressible combustible gas obtained after the partial combustion resulting from its contact with the oxidation catalyst, most of the amount of oxygen has been consumed and removed. Therefore, this compressible combustible gas has an extremely lowered concentration (e.g. less than 4%) of oxygen and retains a high concentration of the combustible gas except for the trace amount thereof that has been consumed in the partial combustion. Accordingly, the system can produce compressed combustible gas that can be compressed in a safe manner without inadvertent ignition of the compressible combustible gas.

According to a further characterizing of the combustible gas processing system of the present invention, said combustible gas is methane or hydrogen.

With the above-described characterizing feature, even if the combustible gas is methane or hydrogen, since oxygen can be removed by the partial combustion on the oxidation catalyst to an extremely low concentration from the oxygen-containing combustible gas containing methane or hydrogen as its principal component and containing also oxygen as described above, there can be produced a compressed natural gas or compressed hydrogen gas by compressing the compressible combustible gas after removal of this oxygen therefrom in a safe manner to be effectively used as an automobile fuel or the like.

According to a still further characterizing feature of the combustible gas processing system of the present invention, the system further comprises a water removing means for receiving the compressible combustible gas before being fed to the compressor and removing water from this compressible combustible gas.

With the above-described characterizing feature, from the compressible combustible gas produced from the partial combustion by the catalytic combusting means and containing water, the water removing means can remove the water and feed the resultant water-removed compressible combustible gas to the compressor. Therefore, at the compressor, the dried compressible combustible gas can be compressed into dried and compressed combustible gas suitable for use as automobile fuel or the like. As a result, the compressor and/or the automobile can be free from water-associated inconvenience.

According to a still further characterizing feature of the combustible gas processing system of the present invention, the system further comprises a concentrating means for receiving material gas containing said combustible gas and oxygen and concentrating the combustible gas contained in the material gas by an adsorbent, thus producing the resultant concentrated gas as said oxygen-containing combustible gas.

With the above-described characterizing feature, the concentrating means removes, with using the adsorbent, the air components such as oxygen from the material gas such as coal mine gas that contains the combustible gas and oxygen, thereby concentrating the combustible gas. The resultant concentrated gas can be used as oxygen-containing combustible gas that contains the combustible gas in a high concentration and contains a trace amount of oxygen. Therefore, if this oxygen-containing combustible gas is subjected to the partial combustion by the catalytic combusting means, it becomes possible to minimize the amount of combustible gas consumed for the sake of oxygen removal, thereby to improve the yield of the compressible combustible gas to be produced from the material gas that contains the combustible gas and oxygen.

According to a still further characterizing feature of the combustible gas processing system of the present invention, said concentrating means includes an adsorption tower charged therein with adsorbent preferentially adsorbing the combustible gas and said concentrating means is configured to effect in alternate repetition, an adsorbing operation for causing the material gas to pass inside of the adsorption tower and a desorbing operation for discharging the oxygen-containing combustible gas from the inside of the adsorption tower at a pressure lower than a pressure used in said adsorbing operation.

With the above-described characterizing feature, when the adsorbing operation is effected, inside the adsorption tower set e.g. approximately at the atmospheric pressure, the combustible gas contained in this material gas being passed is adsorbed by the adsorbent and the remaining exhaust gas is discharged to the outside. In this, there is the possibility of the exhaust gas discharged to the outside from the inside of the adsorption tower to the inside containing a trace amount of combustible gas which was not adsorbed by the adsorbent. However, as its concentration is lower than the explosive concentration range, such amount of gas can be processed in a safe manner.

Next, when the desorbing operation is effected after the adsorbing operation, with suction of the gas, inside the adsorption tower set to a pressure lower than the pressure used in the adsorbing operation, the combustible gas is desorbed from the adsorbent, and this resultant gas containing the combustible gas is discharged as the oxygen-containing combustible gas described above. In this, while the oxygen-containing combustible gas discharged from the inside of the adsorption tower contains a trace amount of oxygen, this oxygen-containing combustible gas contains a large amount of combustible gas desorbed from the adsorbent.

Further, the above-described concentrating means does not require pressurization of the material gas, the exhaust gas or the oxygen-containing combustible gas. So, it is possible to further restrict the risk of explosion of these gases and also to save consumption of energy which would be required for the pressurization.

According to a still further characterizing feature of the combustible gas processing system of the present invention, the system further comprises an introducing means for introducing hydrogen or steam into said oxygen-containing combustible gas fed to said catalytic combusting means.

With the above-described characterizing feature, as the introducing means introduces a gas containing hydrogen and/or steam into the oxygen-containing combustible gas fed to the catalytic combusting means, it becomes possible to suppress carbon deposition on the surface of the oxidation catalyst, thereby to improve the service life of this oxidation catalyst.

More particularly, when oxygen is removed by the partial combustion by causing the oxygen-containing methane gas to contact the oxidation catalyst, this may result in disproportionation of carbon monoxide byproduced in the course of the reaction, which sometimes leads to generation of carbon.

Then, by introducing hydrogen-containing gas to the oxygen-containing methane gas to be fed to the catalytic combustion device, it becomes possible to increase the combustion rate of the partial combustion on the oxidation catalyst surface, whereby deposition of carbon on the oxidation catalyst surface can be effectively suppressed.

Further, if the steam-containing gas is introduced to the oxygen-containing methane gas to be fed to the catalytic combustion device, the partial pressure of steam on the oxidation catalyst surface is raised, so that there occurs reaction between the carbon monoxide and water content according to the chemical equilibrium theory, thus suppressing carbon deposition on the oxidation catalyst surface.

According to a still further characterizing feature of the combustible gas processing system of the present invention, said introducing means is configured to steam-reform a portion of the oxygen-containing combustible gas to render this gas into gas containing hydrogen and steam and then introducing the resultant gas into the other portion of the oxygen-containing combustible gas than the portion thereof to be fed to said catalytic combusting means.

With the above-described characterizing feature, the introducing means can produce the gas containing hydrogen and steam by steam-reforming a portion of the oxygen-containing combustible gas without need to prepare such hydrogen and steam containing gas separately. And, as this hydrogen/steam containing gas produced in this manner is introduced into the remaining portion of the oxygen-containing combustible gas than the portion thereof fed to the catalytic combusting means, the carbon deposition on the oxidation catalyst surface can be suppressed, thereby to improve the service life of this oxidation catalyst.

For accomplishing the above-noted object, according to the present invention, there is provided a combustible gas processing method for producing a compressible combustible gas containing a predetermined combustible gas as a principal component thereof to be compressed by a compressor into a compressed combustible gas, characterized in that the method effects a catalytic combusting step for receiving an oxygen-containing combustible gas that contains oxygen in addition to the combustible gas as the principal component thereof, causing this oxygen-containing combustible gas to contact an oxidation catalyst for partial combustion thereof, to produce the resultant partially combusted gas as said compressible combustible gas.

That is to say, the combustible gas processing method according to the present invention can achieve the equivalent advantageous functions/effects achieved by the combustible gas processing system of the invention by effecting the respective operations effected by the respective means provided in the combustible gas processing system of the invention.

BRIEF DESCRIPTION OF DRAWINGS

FIG. 1 (a) a diagram showing a general construction of a CNG producing system relating to an embodiment of the invention, (b) a table showing result of simulation of concentrations of respective components in the gas produced in the respective processes, FIG. 2 a schematic construction diagram of a catalytic combusting device, FIG. 3 a schematic construction diagram of a dehumidifying device, FIG. 4 (a), (b) schematics showing respective operational conditions in a concentrating device, and FIG. 5 (a) a diagram showing a general construction of a CNG producing system relating to a further embodiment of the present invention, (b) a table showing result of simulation of concentrations of respective components in the gas produced in the respective processes.

BEST MODE OF EMBODYING THE INVENTION

Figure 5:
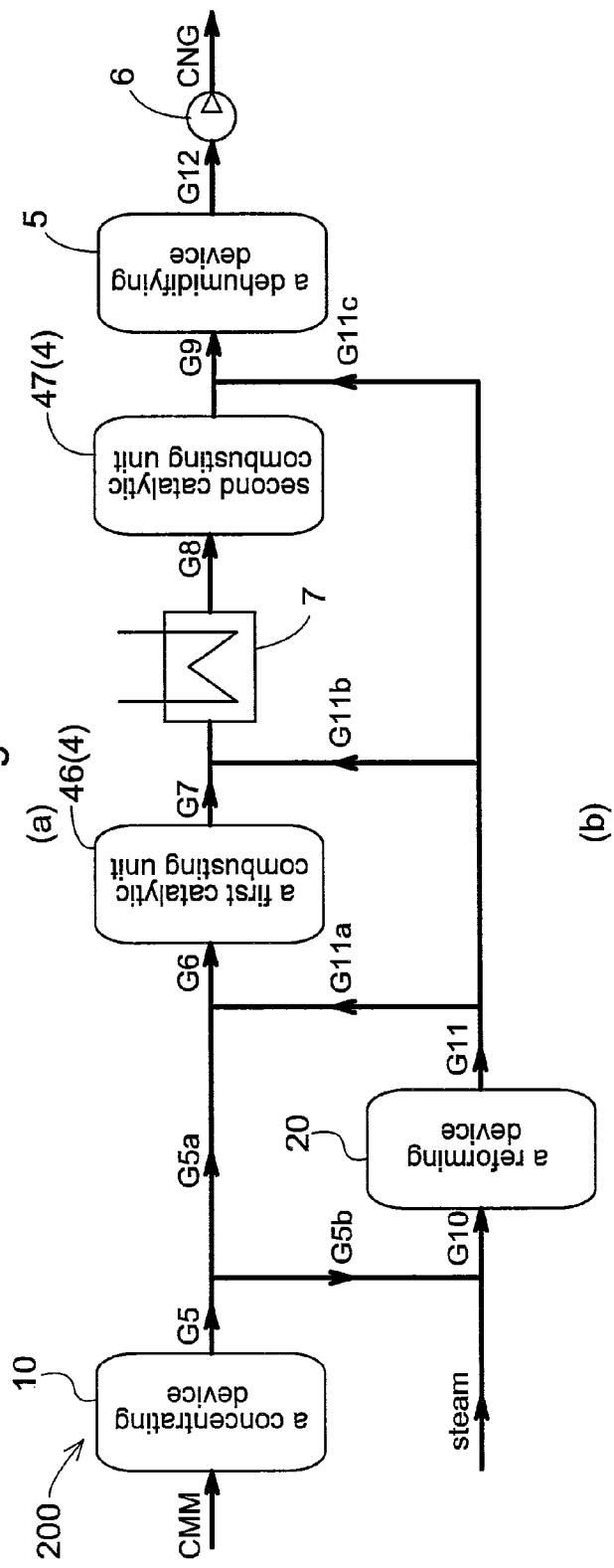

An embodiment of the present invention will now be described with reference to the accompanying drawings. In this embodiment, a combustible gas processing system and a combustible gas processing method relating to the present invention are implemented in a CNG producing system 100 for producing highly compressed natural gas: CNG (Compressed Natural Gas) (an example of "compressed combustible gas") highly useful as e.g. automobile fuel, from CMM (Coal Mine Methane) gas (an example of "material gas") containing methane (an example of "combustible gas").

Incidentally, in FIG. 1, (a) is a diagram showing a general construction of the CNG producing system 100 and (b) is a table showing result of simulation of concentrations of respective components in the gas produced in the respective processes. FIG. 2 is a schematic construction diagram of a catalytic combusting device 4 provided in the present system 100. FIG. 3 is a schematic construction diagram of a dehumidifying device 5 provided in the present system 100. In FIG. 4, (a) and (b) show respective operational conditions in a concentrating device 10.

As shown in FIG. 1 (a), (b), in a coal mine CM, there sometimes is found accumulation of an amount of coal mine gas CMM (an example of "material gas") that contains methane by 30% and contains also oxygen by 20% approximately. And, this coal mine gas CMM is taken out of the coal mine CM by means of a ventilating device 1 and fed to a concentrating device 10.

The concentrating device 10, as will be detailed later, is configured to concentrate methane contained in the coal mine gas CMM, thereby to produce an oxygen-containing methane gas G2 (an example of "oxygen-containing combustible gas") which contains the methane as its principal component and contains also an amount of oxygen.

This oxygen-containing methane gas G2, as shown in FIG. 1(b), contains methane by 80% and contains also an amount of oxygen, i.e. 4% oxygen, greater than or equal to an upper limit oxygen concentration for ensuring safety in the subsequent compressing operation in the production process of compressed natural gas CNG.

Then, as shown in FIG. 1(a), the present system 100 is configured as a methane gas processing system (an example of "combustible gas processing system") for removing oxygen from such oxygen-containing methane gas G2 through partial combustion using an oxidation catalyst 44 to be detailed later, to an extremely low concentration, thereby to produce a compressible methane gas G3, G4 (an example of "compressible combustible gas", i.e. a combustible gas to be compressed), which contains methane as its principal component and which is subsequently compressed by a compressor 6 into a compressed natural gas CNG.

More particularly, the present system 100 includes a catalytic combusting device 4 (an example of "catalytic combusting means") for receiving the above-described oxygen-containing methane gas G2 and causing this oxygen-containing methane gas G2 to contact an oxidation catalyst 44 for partial combustion and producing the resultant partially combusted gas as an oxygen-removed methane gas G3 as the above-described compressible methane gas.

This catalytic combusting device 4, as shown in FIG. 2, includes a casing having an inlet portion 41 for receiving the oxygen-containing methane gas G2 and an outlet portion 42 for discharging the oxygen-removed methane gas G3, a gas passage 43, formed in the casing and extending from the inlet portion 41 to the outlet portion 42, and the oxidation catalyst 44 charged within the gas passage 43 in a gas-permeable manner.

This oxidation catalyst 44 can be any known catalyst capable of promoting the oxidation reaction of methane. For instance, this catalyst 44 may be formed of a support layer having a honeycomb shape for obtaining high specific surface area and a layer of catalyst applied on the support layer and calcined therewith, the catalyst being palladium or platinum type catalyst or a catalyst containing palladium or platinum as its principal component and containing also an auxiliary catalyst of one or more selected from the group consisting of silver, gold, platinum, palladium, ruthenium, iridium and rhodium.

Further, an electric heater 45 is provided for heating the oxidation catalyst 44, whereby the oxidation reaction of methane by the oxidation catalyst 44 is further promoted.

Then, with the catalytic combusting device 4 described above in operation, as the oxygen-containing methane gas G2 comes into contact with the oxidation catalyst 44, there occurs a so-called partial combustion of a very small portion of the amount of methane contained in this oxygen-containing methane gas G2, with using a trace amount of oxygen contained in this oxygen-containing methane gas S2. Incidentally, in this, the combustion temperature on the oxidation catalyst 44 will be lower than the temperature in the case of flame being formed.

Therefore, in the gas resulting from the partial combustion through its contact with the oxidation catalyst 44, most of the oxygen will have been consumed in the partial combustion, as shown in FIG. 1($b$), so this is produced as oxygen-removed methane gas G3 with its oxygen concentration being about 0%, i.e. being lower than the upper limit oxygen concentration (4%).

Also, this oxygen-removed methane gas G3 contains a high concentration of methane of about 78%, excluding the portion of the methane which was consumed in the partial combustion.

Therefore, this oxygen-removed methane gas G3 can be safely compressed by the compressor 6 into compressed natural gas CNG.

Further, the oxygen-removed methane gas G3 thus produced can be directly compressed by the compressor 6 into the compressed natural gas CNG. Alternatively, as this oxygen-removed methane gas G3 contains a certain amount of water produced as the result of the partial combustion by the above-described catalytic combusting device 4, it is preferred that this gas be fed to the compressor 6 after appropriate removal of the water therefrom.

Therefore, the present system 100 includes a dehumidifying device 5 for removing water content contained in this oxygen-removed methane gas G3 thereby to produce dried methane gas G4.

This dehumidifying device 5, as shown in FIG. 3, includes a casing, an inlet portion 51 for introducing the oxygen-removed methane gas G3, an outlet portion 52 for discharging dried methane gas G4, and a gas passage 53 formed upwardly within the casing. And, a heat exchanger 54 is incorporated within the gas passage 53 so as to cool the oxygen-removed methane gas G3 through exchange with cooling water C supplied from the outside.

In operation, as the oxygen-removed methane gas G3 is cooled in the heat exchanger 54, the water contained in this oxygen-removed methane gas G3 is concentrated and removed, whereby dried methane gas G4 is produced and this is taken out from the outlet portion 52.

Further, the concentrated water W produced in this heat exchanger 54 will fill and is discharged to the outside through a drain valve 55.

As described above, on the coal mine gas CMM, the concentrating device 10 effects concentration of methane and the catalytic combusting device 4 effects partial combustion utilizing the oxygen contained in this gas and the resultant gas is dehumidified by the dehumidifying device 5 into the dried methane gas G4. As shown in FIG. 1($b$), this dried methane gas G4 is produced as a dry gas which contains a high concentration of methane of about 81% and extremely low concentrations of oxygen of about 0%, carbon dioxide of about 2.1%, with the oxygen concentration being very much lower than the upper limit oxygen concentration (4%).

And, the compressor 6 can safely compress this dry methane gas G4 to a high pressure (e.g. 20.3 MPa (200 atm) approximately), whereby high quality compressed natural gas CNG can be produced.

The concentrating device 10 described above can have any known construction. However, for the sake of even higher safety and improved efficiency, an adsorption type concentrating device to be described later can be employed. Next, additional discussion will be made on the detailed construction of this concentrating device 10.

This concentrating device 10, as shown in FIG. 1($a$), includes a first concentrating unit 2 and a second concentrating unit 3 arranged in series, so that the first concentrating unit 2 concentrates the methane in the coal mine gas CMM to a concentration of about 55% to produce a first concentrated methane gas G1 (see FIG. 1($b$)) and then the second concentrating unit 3 concentrates the methane contained in the first concentrated methane gas G1 to a concentration of about 80% to produce a second concentrated methane gas G2.

The first concentrating unit 2 and the second concentrating unit 3 can be of concentrating units of an identical construction. And, this construction will be described next with reference to FIG. 4. Incidentally, in FIG. 4 and the following discussion, relative to the marks or numerals of components in the first concentrating unit 2, the marks or numerals of the corresponding components in the second concentrating unit 3 will be shown within the parentheses respectively.

In this concentrating unit 2 (or 3), there is provided an adsorption tower 11 charged therein with an adsorbent 16 that adsorbs methane preferentially, and the unit is configured to execute in alternate repetition with an arrangement of on/off valves 12, 13, 14, a blower 18 and a suction pump 19 and a controller for controlling these, an adsorbing operation for the on/off valves or the like are operated for allowing passage, inside the adsorption tower 11, of the coal mine gas CMM (or the first concentrated methane gas G1) at a pressure approximately equivalent to the atmospheric pressure and a desorbing operation for discharging the first concentrated methane gas G1 (oxygen-containing methane gas G2) from the inside of the adsorption tower 11 at a pressure lower than the pressure used in the adsorbing operation.

Incidentally, the concentrating device 2 (or 3) explained in the instant embodiment includes two adsorption towers 11 (a first adsorption tower 11$a$ and a second adsorption tower 11$b$) having the same construction and arranged in juxtaposition as will be detailed later, so that while one adsorption tower 11 is executing the adsorbing operation, the other adsorption tower 11 executes the desorbing operation. In this way, the adsorbing operation and the desorbing operation are effected in repetition in alternation in the two adsorption towers described above.

The adsorbent 16 charged within the adsorption towers 11 are not particularly limited as long as the adsorbent is a methane adsorbent capable of adsorbing methane preferentially. However, it is preferred to employ a methane adsorbent having an average micropore diameter of 4.5 to 15 Å as measured by the MP method and a methane adsorbing rate of 20 Ncc/g or more at the atmospheric pressure and at 298K, and formed of a material of at least one selected from the group consisting of activated carbon, zeolite, silica gel, and organic metal complex (copper fumarate, copper terephthalate, copper cyclohexanedicarboxylate, etc.), or the like. The average micropore diameter ranges preferably from 4.5 to 10 Å, more preferably from 5 to 9.5 Å. And, the methane adsorbing rate is preferably 25 Ncc/g or more. For instance, according to an exemplary method of obtaining such activated carbon, coconut husk or coconut husk coal charcoal is completely carbonized at 600° C. in nitrogen gas and then pulverized to a particle size of 1 to 3 mm, thus obtaining a carbonaceous material. Then, with using a butch type fluidized activating furnace having an inner diameter of 50 mm, this carbonaceous material is activated at 860° C. in an atmosphere consisting of steam 10-15 Vol %, carbon dioxide 15 to 20 Vol % and nitrogen as the rest. With this, the activated carbon can be obtained.

In this way, by using, as the adsorbent 16, a methane adsorbent capable of preferentially adsorbing methane at the atmospheric pressure and at 298K, methane can be adsorbed sufficiently onto this adsorbent 16 even at the atmospheric pressure and at 298K.

That is to say, if the methane adsorbing rate of the adsorbent 16 at the atmospheric pressure at 298K is lower than 20 Ncc/g, the methane adsorption performance will deteriorate at lower pressures (at the approximately atmospheric pressure, in particular), thus leading to reduction in the methane concentration of the concentrated, first concentrated methane gas G1 (oxygen-containing methane gas G2) and leading to physical enlargement of the device as an greater amount of adsorbent 16 become needed in order to maintain the same adsorption performance. Incidentally, the upper limit of the methane adsorption rate is not particularly limited, but the currently available methane adsorbents provide the maximum methane adsorption rate of 40 Ncc/g or less, approximately.

Further, if the average micropore diameter of the adsorbent 16 as determined by the MP method is smaller than 4.5 Å, this will result in increase in the adsorption rates of oxygen gas and nitrogen gas, whereby the methane concentration of the concentrated, first concentrated methane gas G1 (oxygen-containing methane gas G2) will be lowered, or the average micropore diameter will approximate the molecular size of methane, whereby the adsorption rate will be lower, thus deteriorating or disabling at all the methane adsorption performance. On the other hand, if the average micropore diameter of the adsorbent 16 as determined by the MP method is greater than 15 Å, this will result in deterioration in the methane adsorption performance at low pressures (at the approximate atmospheric pressure in particular). As a result, the methane concentration in the concentrated, first concentrated methane gas G1 (oxygen-containing methane gas G2) will be lowered or physical enlargement of the device will become needed as a greater amount of adsorbent 16 becomes needed in order to maintain the same adsorption performance.

Moreover, as the adsorbent 16, it is preferred to employ one wherein the volume of the pores having an average micropore diameter of 10 Å or less as determined by the HK method is 50% or greater, preferably 70% or greater, more preferably 80% or greater, of the total volume of the micropores. In this case, since the volume of the micropores having the average micropore diameter of 10 Å or less capable of preferentially adsorbing methane occupies 50% or more of the total volume of the micropores, so that with the increased adsorbable amount of methane at the atmospheric pressure (about 0.1 Mpa), methane can be adsorbed sufficiently even at the atmospheric pressure.

On the other hand, as the adsorbent 16, it is preferred to employ one wherein respecting the nitrogen adsorption amount at 77 K, the nitrogen adsorption amount at the relative pressure ratio of 0.013 corresponding to 10 Å average micropore diameter as determined by the HK method is 50% or more, preferably 70% or more, more preferably 80% or more of the nitrogen adsorption amount at the relative pressure ratio of 0.99 corresponding to the total micropore volume. In this case, the adsorption amount at the relative pressure ratio of 0.99 represents the total micropore volume, and the adsorption amount at the relative pressure ratio of 0.013 represents the volume of the micropores having the micropore diameter of 10 Å or less, and the values of the respective ratios indicating the ratio of the pores having the micropore diameters of 10 Å or less being greater, like the case described above. As a result, in the case of concentrating the coal mine gas CMM (or the first concentrated methane gas G1) containing methane as mixed with air, its methane concentration at the near atmospheric pressure can be carried out easily and efficiently.

This concentrating unit 2 (or 3) is configured to introduce the coal mine gas CMM (or the first concentrated methane gas G1) from a pipe 8 via a blower 18 and to discharge the first concentrated methane gas G1 (oxygen-containing methane gas G2) from the pipe 9 via the suction pump 19.

Further, the lower portion inside the adsorption tower 11 is connected via the on/off valve 13 to the exit side of the above-described blower 18 and is connected also via the on/off valve 12 to the entrance side of the suction pump 19. On the other hand, the upper portion inside the adsorption tower 11 is connected via the on/off valve 14 to a pipe 17 which is opened to the atmospheric pressure.

Incidentally, in case the feeding pressure of the coal mine gas CMM (or the first concentrated methane gas G1) to the pipe 8 is sufficiently high, the blower 18 may be omitted appropriately. Further, in case the suction force of the first concentrated methane gas G1 (oxygen-containing methane gas G2) in the pipe 9 is sufficiently high, the suction pump 19 may be omitted appropriately.

And, in executing the adsorbing operation, as indicated by the condition of the first adsorption tower 11a illustrated in FIG. 4 (a) and the condition of the second adsorption tower 11b illustrated in FIG. 4 (b), by closing the on/off valve 12 and opening the on/off valves 13 and 14, the coal mine gas CMM (or the first concentrated methane gas G1) is introduced from the pipe 8 via the blower 18 to the inside of the adsorption tower 11 and the exhaust gas past the adsorbent 16 is discharged from the inside of the adsorption tower 11 to the pipe 17, and in this way, the coal mine gas CMM (or the first concentrated methane gas G1) is caused to pass through the inside of the adsorption tower 11 at an approximate atmospheric pressure. That is to say, in this adsorbing operation, methane contained in the coal mine gas CMM (or the first concentrated methane gas G1) is adsorbed to the adsorbent 16 and the exhaust gas not adsorbed to the adsorbent 16 is discharged to the pipe 17.

Incidentally, regarding the exhaust gas OG discharged to the pipe 17, this may be discharged to the atmosphere. However, as this may contain a certain small amount of methane, it is preferred that the gas be discharged to the atmosphere after effecting e.g. a diluting operation by the ventilating device thereon.

In effecting the desorbing operation after the execution of the above-described adsorbing operation, as indicated by the condition of the second adsorption tower 11b illustrated in FIG. 4 (a) and the condition of the first adsorption tower 11a illustrated in FIG. 4 (b), the on/off valve 12 is opened and the on/off valves 13 and 14 are closed. Then, as the suction force of the suction pump 19 is transmitted to the inside of the adsorption tower 11, the inside of the adsorption tower 11 is depressurized to a pressure lower than the pressure used in the adsorbing operation. Inside the adsorption tower 11 depressurized in this manner, desorption of methane from the adsorbent 16 is promoted, so that the gas containing a large amount of this methane and having a higher methane concentration than the coal mine gas CMM (or the first concentrated methane gas G1) is discharged as the first concentrated methane gas G1 (oxygen-containing methane gas G2) via the suction pump 19 to the pipe 9.

And, this concentrating unit 2 (or 3) is configured to provide in alternate repetition between a first operational state wherein while the first adsorption tower 11a is engaged in the adsorbing operation, the second adsorption tower 11b is engaged in a desorbing operation as shown in FIG. 4 (a) and a second operational state wherein while the first adsorption tower 11a is engaged in a desorbing operation, the second adsorption tower 11b is engaged in an adsorbing operation, as shown in FIG. 4 (b). With this construction, it is possible to continuously discharge the first concentrated methane gas G1 (oxygen-containing methane gas G2) from the pipe 9.

Further, the switchover between the first operational state and the second operational state may be effected by a predetermined time interval. Instead, a further construction as follows is also possible and preferable for instance. The further preferred construction provides the pipe 17 with a methane concentration sensor 15 for detecting the methane concentration of the exhaust gas OG. So, when this methane concentration exceeds a set concentration, it is decided that the adsorption capacity of the adsorbent 11 engaged in the adsorbing operation ongoing in the adsorption tower 11 has reached its limit, so that the first operational state and the second operational state are switched over.

Further, in the case of using the adsorption type concentrating unit 2 (or 3) of the above-described type, in order to suppress reduction in the adsorption performance of the adsorbent 16 due to water content, it is preferred that the water contained in the coal mine gas CMM (or the first concentrated methane gas G1) to be fed to the inside of the adsorption tower 11 be removed in advance.

Other Embodiments (1) A further embodiment than the foregoing embodiment will be described next with reference to FIG. 5.

Incidentally, in FIG. 5, (a) is a diagram showing a general construction of a system 200 relating to the instant embodiment and (b) is a table showing the result of simulation of concentrations of respective components of gases produced in the respective steps.

Also, as to the same constructions as the foregoing embodiments, the same reference marks or numerals are provided and descriptions thereof may be omitted when appropriate.

As shown in FIGS. 5 (a), (b), this system includes a concentrating device 10, like the one used in the foregoing embodiment, so that by concentrating methane contained in coal mine gas CMM with this concentrating device 10, there is produced oxygen-containing methane gas G5 (an example of "oxygen-containing combustible gas) containing methane as its principal component and containing also oxygen. And, as shown in FIG. 5 (b), this oxygen-containing methane gas G5 is a gas that contains methane by 80% approximately and contains also an amount of oxygen, i.e. 4% oxygen, greater than or equal to an upper limit oxygen concentration for ensuring safety in the subsequent compressing operation in the production process of compressed natural gas CNG.

Further, the present system 200, as shown in FIG. 5 (a), includes a catalytic combusting device 4 (an example of "catalytic combusting means") like the one employed in the foregoing embodiment, so that by this catalytic combusting device 4, the above-described oxygen-containing methane gas G5 or the like is caused to contact the oxidation catalyst 44 (see FIG. 2) for partial combustion, and the resultant partially combusted gas is produced as oxygen-removed methane gas G9 as the above-described compressible methane gas.

In implementing the partial combustion by causing the oxygen-containing methane gas G5 or the like to contact the oxidation catalyst 44 by such catalytic combusting device 4 described above, there will encounter such problems as follows. (1) Because of extremely high chemical stability of methane, preheating of the oxygen-containing methane gas G5 to normally 300° C., preferably 400° C. or higher is needed before introducing this oxygen-containing methane gas G5 to the oxidation catalyst 44, so there is a need to separately provide a system for heat-exchange with the reacted gas, (2) Even in case the oxygen-containing methane gas G5 is preheated to 400° C. or higher, implementation of an oxidation reaction of methane requires use of catalyst supporting a large amount of expensive noble metal. (3) As the above-described preheating temperature is added with heat generated from the reaction, the temperature of the oxidation catalyst 44 reaches as high as 450° C. or higher. So, in addition to the oxidation reaction, there will also occur and develop a steam reforming reaction due to water generated from the oxidation reaction, which produces carbon monoxide. And, as this carbon monoxide disproportionates to solid carbon and carbon dioxide, there occurs deposition of carbon on the catalyst, thus resulting deterioration in the catalyst performance over time.

In view of the above, the present system 200 employs arrangements as follows.

The present system 200 does not feed the oxygen-containing gas G5 or the first oxygen-removed methane gas G7 directly to the catalytic combusting device 4, but includes an introducing means for introducing a gas G11 containing one or both of hydrogen and steam to such gases G5, G7.

Specifically, this introducing means is configured as follows. Namely, first a portion of the oxygen-containing methane gas G5 is fed to a reforming device 20 to be added with steam and react on a reforming catalyst, whereby the gas G5 is converted into a reformed gas (to be referred to as "hydrogen-enriched gas" hereinafter) G11 that contains hydrogen as its principal component and contains also carbon monoxide, carbon dioxide and steam. Then, this hydrogen-enriched gas G11 is introduced (added) to the remaining portion of the oxygen-containing methane gas G5 to be fed to the catalytic combusting device 4, to react on the oxidation catalyst 44. As the reaction between hydrogen and oxygen starts in the vicinity of the normal temperature, there hardly exists the need for preheating the oxygen-containing methane gas G5 before its feeding to the oxidation catalyst 44. Rather, a moderate temperature (about 60° C.) which is reached as a result of mixing of the high-temperature, hydrogen-enriched gas G11 will be sufficient.

The reforming device 20 includes a reforming catalyst comprised of an active metal of at least one selected from the group consisting of nickel, ruthenium and rhodium, supported on a refractory inorganic support comprised of one or a mixture of at least two selected from the group consisting of alumina, zirconia, silica, and titania, a desulfurizing catalyst provided, when needed, on the upstream of the reforming catalyst, and a burner or a heater for supplying heat required for the reaction. With this reforming device 20 in operation, in case the oxygen-containing methane gas G5 contains sulfur, this gas is caused to pass the desulfurizing catalyst for reducing the sulfuric compound concentration in this oxygen-containing methane gas G5 to e.g. 0.1 ppm in volume, preferably to 0.01 ppm approximately. Then, this gas is added with steam and then the resultant gas is caused to pass the reforming catalyst which has been heated by the heater or the like to 650° C. to 800° C. approximately, whereby the oxygen-containing methane gas G5 is converted into the hydrogen-enriched gas G11.

As the reaction between oxygen and hydrogen occurs extremely easily, it is possible to employ, as the oxidation catalyst 44, a relatively inexpensive catalyst such as commercially available Pt/alumina type catalyst, a Pd/alumina type catalyst or the like for use in e.g. deodorization by catalytic oxidation. A Pt catalyst has a high oxidation activity, but low steam reforming activity, thus less risk of carbon deposition. Therefore, a Pt catalyst is especially preferred. Further, a catalyst comprising a support formed of alumina, titania, or zirconia or a mixture of two or more of these and Pt and Pd supported thereon has superior oxidation activity at low temperatures, so that the catalytic combustion reaction can start at a temperature of 100° C. or lower, e.g. at 45 to 80° C. approximately. Therefore, using this catalyst is economically advantageous as eliminating the need for preheating of the oxygen-containing methane gas G5 before its feeding to the oxidation catalyst 44.

The shape of the oxidation catalyst 44 is not particularly limited, it being e.g. particulate shape, honeycomb shape, mat-like shape, etc. However, a honeycomb shape is preferred in case pressure loss is problematic. In this case, e.g. a washcoat honeycomb having catalyst coated on a refractory formed of e.g. cordierite, can be employed. In the case of using a particulate catalyst, a radial-flow type or lateral-flow type reactor or the like can be employed, since this makes it possible to achieve reduction in pressure loss while restricting occurrence of flow rate non-uniformity.

Incidentally, it is preferred that the highest temperature (normally the exit temperature of the catalyst) of the oxidation catalyst 44 not exceed 350° C. If 350° C. is exceeded, this may trigger steam reforming reaction of methane, thus leading to deposition of carbon on the catalyst. In case oxygen is removed by one stage of reaction, the above-described upper limit temperature can sometimes be exceeded, depending on the oxygen concentration (e.g. 2% or more).

In such case, as shown in FIG. 5 (*a*), the catalytic combusting device 4 having the oxidation catalyst 44 may be constructed with two or more stages, so as to divide the addition operation of hydrogen-enriched gas G11 into two or more stages, and a heat-removing unit 7 may be provided between the stages. With these arrangements, it is possible to prevent the highest temperature of the oxidation catalyst 44 from exceeding 350° C.

More particularly, this modified catalytic combusting device 4 includes, a first catalyst combusting unit 46 and a second catalyst combusting unit 47, arranged in series. That is, the oxygen-containing methane gas G5 is fed to the first catalytic combusting unit 46 for partial combustion, thereby to produce the first oxygen-removed methane gas G7 and then, this first oxygen-removed methane gas G7 is cooled appropriately by the heat-removing unit 7. Thereafter, this cooled first oxygen-removed methane gas G8 is fed to the second catalytic combusting unit 47 for partial combustion, thereby to produce a second oxygen-removed methane gas G9 with oxygen substantially completely removed. And, the introducing means introduces the hydrogen-enriched gas G11, (G11*a*, G11*b*) in distribution to each of the gases G5, G7 to be fed to these first catalytic combusting unit 46 and the second catalytic combusting unit 47.

In the case of the simulation result shown in FIG. 5 (*b*), a gas portion G5*b* of 16.6 Nm$^3$/h of the oxygen-containing methane gas G5 flowing at the rate of 625 Nm$^3$/h is fed to the reforming device 20 and 38.8 Nm$^3$/h gas portion G11*a* of the resultant 69 Nm$^3$/h hydrogen-enriched gas G11 is introduced to the oxygen-containing methane gas G5 to be fed to the first catalytic combusting unit 46, and the remaining 29.8 Nm$^3$/h gas portion G11*b* is introduced to the first oxygen-removed methane gas G7 to be fed to the second catalytic combusting unit 47.

Further, with the above arrangement of feeding the hydrogen-enriched gas G11 (G11*c*) thus produced with the supply amount adjustment to the second oxygen-removed methane gas G9, it is possible also to adjust the combustion rate of the compressed natural gas CNG after the subsequent compression by the compressor 6, to be suitable for its application as e.g. automobile fuel.

Next, there will be shown results of investigation made on time changes observed in the activity of the oxidation catalyst 44 with the feeding of the oxygen-containing methane gas G5 to the above-described reforming device 20 and the catalytic combusting device 4. Incidentally, Examples 1-3 show the results of cases with changes in the shape of the oxidation catalyst 44, the support and the metal to be supported thereon.

Example 1

3 ml of catalyst comprised of 3 mm spherical γ alumina support and 2 mass % of Pt supported thereon was charged into a stainless steel reactor tube having 14 mm inner diameter. Then, a gas having a gas composition of methane 85.8%, hydrogen 3.4%, carbon monoxide 0.6%, carbon dioxide 0.4%, steam 0.9%, oxygen 1.7%, and nitrogen 7.2% (this gas had a temperature of about 50° C.) was fed at a rate of 2.25 liter/min. to the reactor tube and the exit temperature of the catalyst was elevated progressively from the room temperature. The gas fed as above corresponds to a gas obtained by adding a hydrogen-enriched gas to 100 volume parts of oxygen-containing gas containing 90% methane and 10% air, which hydrogen-enriched gas is obtained by adding 2.3 volume parts of steam to 1.2 volume parts of the oxygen-containing methane gas and then subject the resultant mixture to a reforming reaction at 700° C. When this catalyst exit temperature reached 120° C., a sharp rise in the catalyst exit temperature was observed. This indicated initiation of hydrogen-oxygen reaction. Under the condition of the catalyst exit temperature being 300° C. (condition of effecting heating accompanied by heat discharge, and simulated heat-insulated condition), the oxygen concentration in the catalyst exit gas was 0.01% or lower and the carbon monoxide concentration in the same was 0.01% or lower. After about 150 hours with keeping the catalyst exit temperature at 300° C., determination of the reaction initiation temperature was conducted by the same method as described hereinbefore. The result showed that the temperature had dropped to 110° C. That is to say, with this catalyst, no deactivation over time was found.

Example 2

The catalyst was replaced by one comprising a 3 mm cylindrical zirconia support and 2 mass % of Pt supported thereon. Except this, the experiment was conducted in the same manner as in Example 1 described above. The initial reaction initiation temperature was 125° C. and the oxygen concentration in the catalyst exit gas when the catalyst exit temperature was 300° C. was 0.01% or less and the carbon monoxide concentration in the same was 0.01% or less. After about 150 hours with keeping the catalyst exit temperature at 300° C., determination of the reaction initiation temperature was conducted by the same method as described hereinbefore. The result showed that the temperature had dropped to 105° C. That is to say, with this catalyst, no deactivation over time was found.

Example 3

The catalyst was replaced by one comprising a 3 mm cylindrical zirconia support and 0.5 mass % of Pt and 2.5% Pd supported thereon. Except this, the experiment was conducted in the same manner as in Example 1 described above. The initial reaction initiation temperature was 45° C. and the oxygen concentration in the catalyst exit gas when the catalyst exit temperature was 300° C. was 0.01% or less and the carbon monoxide concentration in the same was 0.01% or less. This shows that the present catalyst supporting Pd in addition to Pt exhibits high low-temperature activity. After about 25, 50 and 150 hours with keeping the catalyst exit temperature at 300° C., determinations of the reaction initiation temperature were conducted by the same method as described hereinbefore. The results showed that in all the cases, the reaction started at 60° C. That is to say, with the present catalyst, deactivation over time sometimes occurred at a very early stage, but the activity became stable and stayed stable thereafter. So, the catalyst could be used satisfactorily for the oxygen removal reaction at about 60° C.

Therefore, when the hydrogen-rich gas G11 from the reforming device 20 was added to the oxygen-containing gas G5 and the resultant mixture gas was fed to the catalysts of the above-described respective embodiments as the oxidation catalysts 44 of the catalytic combusting device 4, the catalytic reactions were initiated at the relatively low temperatures, hardly needing any preheating. And, it was also confirmed that while the oxygen concentration was reliably reduced, hardly any deactivation over time thereof occurred.

Incidentally, in the above-described construction, to the gases G5, G7 fed by the introducing means to the catalytic combusting device 4, the hydrogen-enriched gas G11 (G11a, G11b) was introduced respectively. However, even in the case also of alternative construction of introducing steam instead of the hydrogen-enriched gas G11, deposition of carbon on the oxidation catalyst 44 surface can be effectively suppressed. That is, as the methane added with such steam is fed to the catalytic combusting device 4, there occurs rise in the steam partial pressure on the oxidation catalyst 44 surface, and carbon monoxide and water reacts with each other according to the chemical equilibrium theory, thus suppressing carbon deposition on the oxidation catalyst 44 surface.

(2) In the foregoing embodiment, the gas obtained by concentrating the coal mine gas CMM by the concentrating device 10 was used as the oxygen-containing combustible gas G2 containing a combustible gas such as methane as its principal component and containing also oxygen, and this oxygen-containing combustible gas G2 was fed to the catalytic combusting device 4. However, if the material gas per se contains a combustible gas as its principal component and contains also oxygen, the concentrating device may be omitted and this material gas can be fed directly to the catalytic combusting device.

(3) In the foregoing embodiment, the oxygen-removed methane gas G3 after removal of oxygen by the catalytic combusting device 4 was dehumidified by the dehumidifying device 5 and then fed as the compressible methane gas to the compressor 6 to be compressed thereby, thus formed into the compressed natural gas CNG. Alternatively, if presence of water in the oxygen-removed methane gas G3 is permissible, the dehumidifying device 5 may be omitted and this oxygen-removed methane gas G3 may be directly fed to the compressor 6 to be compressed thereby.

(4) In the foregoing embodiment, the catalytic combusting device 4 was constructed such that the oxidation catalyst 44 was charged under gas-permeable condition within the gas passage 43. Instead, the construction of the catalytic combusting device may be modified in may ways, such as a construction wherein the oxidation catalyst is arranged along the gas flow of the gas passage.

(5) In the foregoing embodiment, the coal mine gas CMM was employed as the material gas. Instead of this, any other material gas than coal mine gas CMM can be employed, as long as such other gas contains a combustible gas such as methane, hydrogen, etc.

(6) In the foregoing embodiment, the combustible gas processing system and method relating to the present invention were implemented in a CNG producing system for producing compressed natural gas CNG from coal mine gas CMM as a material gas containing methane as a combustible gas. Instead, the invention is applicable also to a system for producing compressed combustible gas such as compressed hydrogen gas from a material gas containing hydrogen as a combustible gas, rather than methane.

INDUSTRIAL APPLICABILITY

The present invention is applicable to provide, for use in a combustible gas processing for producing a compressible combustible gas containing a predetermined combustible gas such as methane, hydrogen or the like as a principal component thereof to be compressed by a compressor into a compressed combustible gas, a technique that allows removal of oxygen to an extremely low concentration from an oxygen-containing combustible gas containing combustible gas as its principal component and containing also oxygen by an amount greater than or equal to an upper limit oxygen concentration that ensures safety in the compression in the production process of the compressed combustible gas, the technique further allowing effective utilization of a material gas such as coal mine gas containing air components in addition to methane, as a compressed combustible gas as automobile fuel in a combustible gas processing system and a combustible gas processing method.

The invention claimed is:

1. A methane gas processing system for producing a compressible combustible gas containing a predetermined methane gas as a principal component thereof to be fed to and compressed by a compressor, said system comprising a catalytic combusting means for receiving an oxygen-containing methane gas that contains oxygen in addition to the methane gas as the principal component thereof, causing this oxygen-containing methane gas to contact an oxidation catalyst for partial combustion thereof, to produce a resultant partially combusted gas as said compressible combustible gas, wherein the oxidation catalyst comprises a support formed of alumina, titania, or zirconia, or a mixture of two or more of these and Pt and/or Pd supported thereon, the catalytic combusting means having the oxidation catalyst is constructed with a first stage and a second stage arranged in series, a heat-removing unit is provided between said first stage and said second stage, the oxygen-containing methane gas is partially combusted by said first stage to produce a first deoxygenated methane gas, the first deoxygenated methane gas is cooled by the heat-removing unit, and the cooled first deoxygenated methane gas is partially combusted by the second stage as the compressible combustible gas, a second deoxygenated methane gas from which oxygen is removed, the methane gas processing system further comprises an introducing means for introducing a gas containing hydrogen and/or steam into said oxygen-containing methane gas prior to the first stage of said catalytic combustion means and into said first deoxygenated methane gas prior to the second stage of said catalytic combustion means, and the methane processing system controls a highest temperature of the oxidation catalyst so as not to exceed 350° C. by using the introducing of the gas containing hydrogen and/or steam and the heat-removing unit.

2. The methane gas processing system according to claim 1, further comprising a water removing means for receiving the compressible combustible gas before being fed to the compressor and removing water from this compressible combustible gas.

3. The methane gas processing system according to claim 1, further comprising a concentrating means for receiving material gas containing said methane gas and oxygen and concentrating the methane gas contained in the material gas by an adsorbent, thus producing a resultant concentrated gas as said oxygen-containing methane gas.

4. The methane gas processing system according to claim 3, wherein said concentrating means includes an adsorption tower charged therein with adsorbent preferentially adsorbing the methane gas and said concentrating means is configured to effect in alternate repetition, an adsorbing operation for causing the material gas to pass inside of the adsorption tower and a desorbing operation for discharging the oxygen-containing methane gas from the inside of the adsorption tower at a pressure lower than a pressure used in said adsorbing operation.

5. The methane gas processing system according to claim 1, wherein said introducing means is configured to steam-reform a portion of the oxygen-containing methane gas to render this gas into gas containing hydrogen and steam and then introducing the resultant gas into the other portion of the oxygen-containing methane gas than the portion thereof to be fed to said catalytic combusting means.

* * * * *

UNITED STATES PATENT AND TRADEMARK OFFICE
CERTIFICATE OF CORRECTION

| | | |
|---|---|---|
| PATENT NO. | : 8,899,968 B2 | Page 1 of 1 |
| APPLICATION NO. | : 12/670058 | |
| DATED | : December 2, 2014 | |
| INVENTOR(S) | : Kenji Seki et al. | |

It is certified that error appears in the above-identified patent and that said Letters Patent is hereby corrected as shown below:

In the Claims

Column 17, Line 16, Claim 1, after "stage" insert -- to produce, --

Signed and Sealed this
Thirty-first Day of March, 2015

Michelle K. Lee
*Director of the United States Patent and Trademark Office*